United States Patent [19]
Grigsby et al.

[11] Patent Number: 5,426,916
[45] Date of Patent: Jun. 27, 1995

[54] LIQUID-IMPREGNATED PROTECTIVE SHEET AND METHOD OF USE

[75] Inventors: Thomas E. Grigsby; William B. Brecht, both of Corvallis; John W. Swanson, Portland, all of Oreg.

[73] Assignee: Evanite Fiber Corporation, Corvallis, Oreg.

[21] Appl. No.: 212,283

[22] Filed: Mar. 14, 1994

Related U.S. Application Data

[63] Continuation of Ser. No. 954,941, Sep. 30, 1992, abandoned, which is a continuation of Ser. No. 714,068, Jun. 12, 1991, abandoned, which is a continuation-in-part of Ser. No. 538,039, Jun. 13, 1990, abandoned.

[51] Int. Cl.⁶ .............................. B65B 55/18
[52] U.S. Cl. .......................... 53/431; 53/433; 53/434; 53/449; 53/452; 53/472; 264/211; 264/211.12
[58] Field of Search .......... 428/320.2, 321.1, 321.5; 206/317, 819; 264/211, 211.12, 45.9; 156/91, 93, 145; 53/431, 433, 434, 449, 452, 472

[56] References Cited

U.S. PATENT DOCUMENTS

| | | | |
|---|---|---|---|
| 1,241,853 | 10/1917 | Jury | 428/497 |
| 1,729,681 | 10/1929 | Panthen | 428/497 |
| 1,846,239 | 2/1932 | Wolfe | 428/497 |
| 2,659,958 | 11/1953 | Johnson | 428/190 |
| 3,274,319 | 9/1966 | Clegg | 264/126 |
| 3,351,495 | 11/1967 | Larsen et al. | 429/252 |
| 3,515,582 | 6/1970 | Blackley et al. | 428/264 |
| 3,526,565 | 9/1970 | Walter | 428/193 |
| 3,571,814 | 3/1971 | Miller | 2/236 |
| 3,632,383 | 1/1972 | Dominick | 427/285 |
| 4,024,323 | 5/1977 | Versteegh | 429/249 |
| 4,052,095 | 10/1977 | Johnson | 294/74 |
| 4,452,856 | 6/1984 | Lovell | 428/312.8 |
| 4,501,782 | 2/1985 | Weatherly et al. | 428/57 |
| 4,502,263 | 3/1985 | Crass et al. | 428/497 |
| 4,600,626 | 7/1986 | Ogata | 428/193 |
| 4,856,837 | 8/1989 | Hammersla, Jr. | 294/74 |
| 4,892,779 | 1/1990 | Leatherman et al. | 428/220 |
| 4,937,115 | 6/1990 | Leatherman | 428/36.4 |
| 4,959,208 | 9/1990 | Chakrabarti et al. | 424/78 |

FOREIGN PATENT DOCUMENTS 59-212248 12/1984 Japan .............................. 428/321.1

*Primary Examiner*—Christopher W. Raimund
*Attorney, Agent, or Firm*—Klarquist Sparkman Campbell Leigh & Whinston

[57] ABSTRACT

A liquid-impregnated flexible sheet includes high capillarity pores for retaining the impregnated fluid. The fluid may be an oil having a boiling point and vapor pressure sufficient to promote vaporization of the oil at room temperature. The vaporizable oil can function as a corrosion inhibitor making the sheet useful for wrapping metallic articles. A surfactant may also be added to the sheet to enhance corrosion inhibition. The sheet comprises a homogenous mixture of a polyolefin-based component and an inert filler. The sheet may be used alone or as one component of a composite that includes materials that have other desirable properties. The composite may be assembled into a container, such as a gun case.

21 Claims, 1 Drawing Sheet

LIQUID-IMPREGNATED PROTECTIVE SHEET AND METHOD OF USE

This application is a continuation of application Ser. No. 07/954,941, filed on Sep. 30, 1992 and now abandoned, which is a continuation of Ser. No. 07/714,068, filed Jun. 12, 1991, now abandoned, which is a continuation-in-part of 07/538,039, filed Jun. 13, 1990, now abandoned.

TECHNICAL FIELD

This invention pertains to material used for wrapping or covering articles, and particularly to liquid-impregnated protective sheets that may be used alone or with other materials in the form of a container.

BACKGROUND INFORMATION

The usefulness of certain protective sheets or wrapping material may be enhanced by impregnating the material with a fluid, such as oil. For example, U.S. patents to Panthen (U.S. Pat. No. 1,729,681), Jury (U.S. Pat. No. 1,241,853), and Wolfe (U.S. Pat. No. 1,846,239) describe wrapping cloths that are impregnated with mixtures that include oil for making the material waterproof and non-adhesive.

Wrapping material or cloth that is impregnated with oil is usually difficult to handle because the oil readily flows from the material to the hands of the user or to the article being wrapped. Moreover, the beneficial effects of the oil-impregnated material are gradually lost as oil flows from the wrapping material.

SUMMARY OF THE INVENTION

This invention is directed to a liquid-impregnated sheet of material that has very high internal capillarity for retaining the fluid therein and a method of using the same. In a preferred embodiment, the sheet is impregnated with an oil and used for covering or wrapping articles to prevent corrosion. The sheet is made so that only a nominal and controlled amount of oil flows from the material to the covered article. Consequently, the advantages of an oil-impregnated sheet are maintained for a predictable and extensive period of time.

The sheet of material may be impregnated with any of a number of types of oil, depending upon the particular article that is to be covered or protected by the material. For example, mineral oil is employed for preventing corrosion of metal articles. An oil having a boiling point and a vapor pressure sufficient to promote vaporization of the oil at room temperature is preferred. A vaporizable oil can function as a vapor corrosive inhibitor by coating the metal articles with an oil barrier. The barrier inhibits moisture from oxidizing the surface of the metal.

A surfactant may be added to the oil to enhance the moisture barrier on the metal article within the sheet. The surfactant reduces the surface tension of the oil to facilitate flow of the oil over the surface of the metal article. A surfactant having a polar region and a non-polar or hydrophobic region is preferred since the polar region is attracted to the surface of the metal while the non-polar region extends away from the metal to provide an effective barrier to moisture. In addition, a surfactant of suitable molecular weight may vaporize and act as a corrosion inhibitor.

There are numerous applications for liquid-impregnated sheets formed in accordance with the present invention. For example, a sheet of material that is impregnated with an insecticide or herbicide may be placed as a ground cover or as a barrier between the ground and a house foundation. Such an impregnated sheet will provide a long term application of the insecticide or herbicide.

The liquid-impregnated sheet may be used alone or as one component of a composite that includes materials that have other desirable properties, such as liquid permeability or impermeability, conductivity, tensile strength, impact resistance, aesthetic value, insulating characteristics and/or shielding from externalities such as electromagnetic radiation. The composite may be assembled into a container, such as a gun case, tool case or packaging container.

A sheet of liquid-impregnated material made in accordance with the present invention particularly comprises a homogenous mixture of a polyolefin-based component and an inert filler. The filler is an agglomerate of fine particles that defines within the sheet very small pores that retain the impregnated fluid.

DETAILED DESCRIPTION OF PREFERRED EMBODIMENTS

Figure 1:
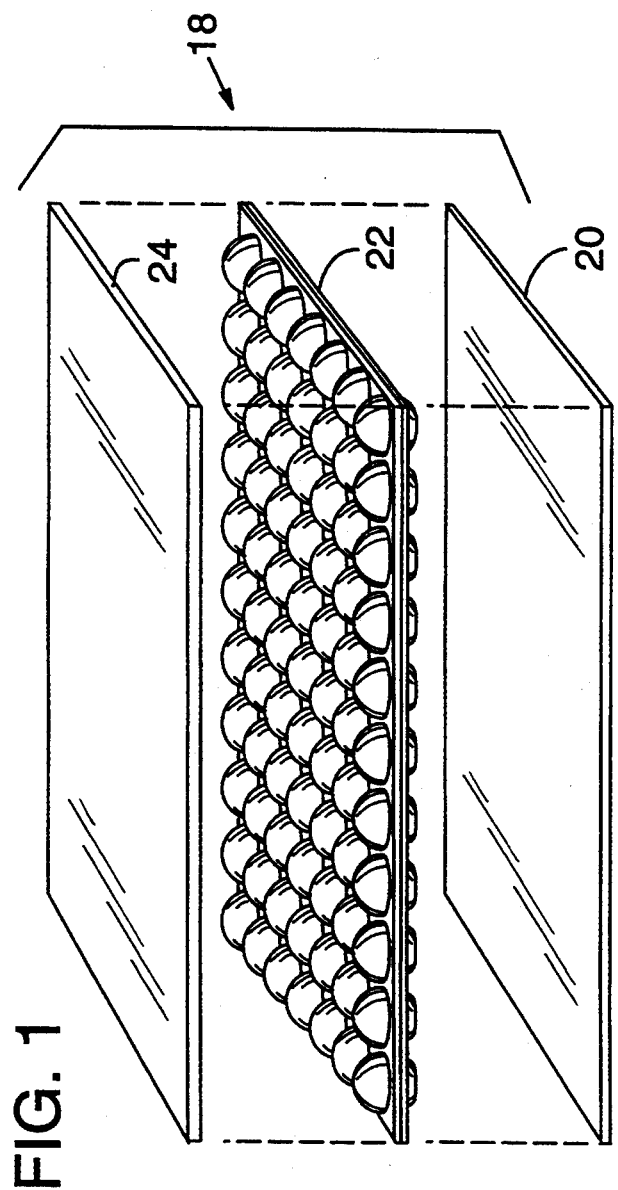
FIG. 1 is an exploded perspective view showing three components of a composite that employs a sheet of liquid-impregnated material that is formed in accordance with the present invention.

One embodiment of a liquid-impregnated sheet of the present invention is formed of a mixture of a polyolefin-based component, an inert filler, and an oil that is processed, such as by extrusion, into a thin sheet of flexible material.

More particularly, the polyolefin-based component is preferably an ultra high molecular weight (UHMW) polyolefin that may be blended with a polyolefin copolymer that is formed of an olefin and an ethylenically unsaturated monocarboxylic acid selected from a group consisting of acrylic and methacrylic acids.

As used herein, the term, "UHMW polyolefin" means a polyolefin having a molecular weight of about 3,000,000 or greater. The UHMW polyolefin may be polyethylene, polypropylene, polybutene, ethylene-propylene copolymers, and ethylene-propylene-butene copolymers. Particularly preferred, however, are polyethylene or isotactic polypropylene homopolymers that have a standard load melt index of less than about 0.04 grams per 10 minutes, preferably zero, as measured in accordance with ASTM D 1238–70, and an intrinsic viscosity greater than about 3.0.

Although UHMW polyolefin is preferred, it is contemplated that acceptable results will be achieved with polyolefins having a molecular weight of less than 3,000,000.

Conventional stabilizers or antioxidants are added to the mixture of the polyolefin-based component, inert filler, and oil to prevent thermal oxidative degradation of the polyolefin component. Representative of such stabilizers are 4,4 thiobis (6-tert-butyl-m-cresol) and 2,6-di-tert-butyl-4-methylphenol.

The olefin part of the polyolefin copolymer with which the UHMW polyolefin is blended may be either a single olefin or a mixture of olefins (i.e., terpolymers).

The olefin part of the copolymer preferably comprises between about 90% to 99% by weight of the copolymer. The preferred olefins are ethylene and propylene.

Examples of suitable polyolefin copolymers are ethylene-acrylic and/or methacrylic acid, and propylene-acrylic and/or methacrylic acid. Suitable polyolefin terpolymers that may be employed include ethylene-propylene-acrylic and/or methacrylic acid, and ethylene-vinyl acetate-acrylic and/or methacrylic acid.

The polyolefin-based component is between about 30% and 50% by weight UHMW polyolefin. The polyolefin copolymer, which makes up about 50% to 70% by weight of the polyolefin-based component is between about 90% to about 99% by weight olefin and 1% to about 10% by weight ethylenically unsaturated monocarboxylic acid selected from the group consisting of acrylic acid, methacrylic acid and mixtures thereof.

An alternative embodiment of the polyolefin-based component of the present invention is a mixture of a UHMW polyolefin blended with a low molecular weight (LMW) polyolefin and a polymer of an ethylenically unsaturated monocarboxylic acid selected from the group consisting of acrylic and methacrylic acid, and mixtures thereof. The term "LMW polyolefin" means polyolefins having a melt index greater than zero, and preferably greater than about 10, and/or intrinsic viscosity less than about 3.0, and preferably less than 2.0. The preferred LMW polyolefins are homopolymers and copolymers of thylene and propylene.

The LMW polyolefin homopolymers or copolymers comprise an amount sufficient to maintain the level of the UHMW polyolefin between about 30% and 60% by weight of the composition and to maintain the level of the acid component of the copolymer between about 1% and 10% by weight of the copolymer and LMW polyolefin portion of the mixture.

As noted earlier, the polyolefin-based component is mixed with an inert filler. The filler comprises very small agglomerated particles having diameters between about 1.0 and 20.0 microns. Any of a number of inert fillers may be employed, such as carbon black, coal dust and graphite; metal oxides and hydroxides, such as those of silicon, aluminum, calcium, magnesium, barium, titanium, iron, zinc and tin; metal carbonates, such as those of calcium and magnesium; minerals, such as mica, montmorillonite, kaolinite, attapulgite, asbestos, talc, diotamaceous earth and vermiculite; synthetic and nature zeolites; portland cement; precipitated metal silicates, such as calcium silicate and aluminum polysilicate; alumina silica gels; glass particles, including microbeads, hollow microspheres, flakes and fibers; and salts, such as molybdenum disulfide, zinc sulfide and barium sulfate.

Preferably, the filler comprises polysilicate particles, which define within the sheet pores that have an average diameter of between about 0.05 and 0.5 microns. The small pore size provides very high capillarity for retaining fluid within the sheet. Increasing the size of the filler particles increases the size of the pores. Sheets having pore sizes as high as 20.0 microns should provide sufficient capillarity for retaining fluids within the sheets.

Preferably, the filler is between 50% to 75% by weight of the mixture of the filler and the polyolefin-based component.

The oil, such as mineral oil, with which the sheet of the present embodiment is impregnated, is added to the polyolefin-based component and filler to make up about 20% to 70% by weight of the resulting mixture. The polyolefin-based component, filler and oil are mixed by any suitable mechanism for producing a substantially homogenous mixture. To this end, the components may be premixed at room temperature in a blender. The resultant composition is then mixed in a conventional mixture, such as a Banbury mixer, or melt-homogenized in a conventional two-roll mill.

After mixing, the mixture is molded or shaped into a sheet by any conventional mechanism, such as a twin-screw extruder. Other conventional sheet-forming methods may be employed, such as calendaring, injection molding, or compression molding.

The processed sheet is a generally plastic, thin flexible material that is easily shaped into any of a variety of configurations.

The following example illustrates a particular method for forming a liquid-impregnated sheet of material in accordance with the present invention.

EXAMPLE

A blend was prepared comprising the following components:

9% by weight ultra high molecular weight polyethylene homopolymer, as manufactured by American Hoechst Corp., and sold under the name GUR-412;

3% by weight polyolefin homopolymer, as manufactured by Quantum Chemical Corp., and sold under the name PETROTHENE 5402, this homopolymer having a melt index (ASTM 1238-70) in the range of 0.15–0.25 grams per 10 minutes;

26% by weight polysilicates, as manufactured by PPG Industries and sold under the name HI-SIL SBG;

60% by weight mineral oil;

0.1% by weight antioxidant, such as manufactured by Ethyl Corporation under the name AN-702;

0.1% by weight stabilizer, such as manufactured by Morton International under the name DSTDP; and 0.1% by weight lubricant, such as manufactured by Synthetic Products Co., under the name CP-11-OS.

The polyolefin homopolymer and the polysilicates were pre-blended. The dry ingredients were then blended together in a Henschel high-intensity mixer and the mineral oil, stabilizer, antioxidant and lubricant were added while the blending was in progress. The mixture was then fed to the hopper of a twin-screw extruder and extruded through a die to form a continuous sheet of material 150 centimeters wide and 0.45 millimeters thick.

The oil-impregnated flexible sheet formed as just described is particularly useful for covering stored metal articles to prevent corrosion of the articles. To this end, a single oil-impregnated sheet may be wrapped around the article to completely cover the article. The oil does not readily flow from the sheet because of the high internal capillarity that is attributable to the very small pore size within the sheet. Accordingly, the sheet may be easily handled with little or no oil remaining on the hands of the user.

A small amount of oil will gradually flow from the oil-impregnated sheet to the wrapped metal article. The rate of oil flow will generally depend upon factors such as the surface energy of the article that is wrapped, the storage temperature, the oil viscosity, etc. In any event, the resulting thin layer of oil on the article will enhance the corrosion protection provided by the oil-impregnated sheet.

It is contemplated that the sheet formed in accordance with the present invention may be impregnated with oils other than mineral oil. For example, the sheet could be impregnated with linseed oil for applications in which the sheet is used to cover leather products. Wood furniture could be wrapped in sheets that are impregnated with lemon oil. These alternative oils may be added during the mixing process described above. It is possible, however, that one oil, such as mineral oil, may be more advantageous than another oil, such as lemon oil, for facilitating extrusion of the polyolefin-based component, filler, and oil mixture, as described above. Consequently, the mixture from which the sheet may be initially formed may include one type of oil that can be later extracted by a suitable solvent, and the sheet of material may thereafter be impregnated with another oil (or, as described below, another fluid) that is more suitable in view of the final use of the impregnated sheet.

The oil with which the sheet is impregnated may be mixed with other useful compounds. For instance, in applications where corrosion is important, the mineral oil may be mixed with conventional surface-reactive corrosion inhibitors.

As noted earlier, the fluid with which the sheet is impregnated may be any of a variety of types. For example, the sheet may be impregnated with a conventional liquid insecticide or herbicide and thereafter placed adjacent to cultivated plants as a ground cover or wrap to protect plants from harmful insects or weeds. It can be appreciated that the flexible sheet will also retain moisture within the covered ground.

The liquid-impregnated sheet of the present invention may be used alone or as a composite of other materials that have desirable properties, such as liquid permeability or impermeability, conductivity, tensile strength, impact resistance, aesthetic value, insulating characteristics and/or shielding from externalities such as electromagnetic radiation.

FIG. 1 shows an exploded perspective view of such a composite 18. More particularly, to construct the illustrated composite 18, an oil-impregnated sheet 20 as formed in accordance with this invention may be covered with, for example, a liquid-impervious, cushioning layer 22, and an outer layer 24. The sheet 20 may be attached to layer 22 by stitching, heat lamination, or pressure-sensitive thermal or ultraviolety cured adhesion. The cushioning layer 22 may be, for example, a conventional "bubble pack" plastic packing material of the type in which a multitude of air-filled embossments protrude from the plane of the material and provide cushioning for a wrapped article.

The outer layer 24 is included to add strength, durability, aesthetic value, or other desired physical properties. The outer layer 24 may be, for example, leather, vinyl, fabric or similar material.

It is noteworthy that the cushioning layer 22 (or any liquid-impervious layer that is secured adjacent to the sheet 20) serves to prevent the migration of oil from the sheet 20 to the outer layer 24. Accordingly, the impervious cushioning layer 22 effectively seals one side of the sheet 20 to prevent oil loss from one side of the composite 18, and to prevent other fluids, such as room air or water, from reaching the oil-impregnated sheet.

It will be obvious to one of ordinary skill in the art that the sheet 20 may be used with various combinations of layers of material, such as wood, fabric, plastic, organic or inorganic materials, or porous or nonporous materials, to form numerous variations of the composite illustrated in FIG. 1.

Figure 2:
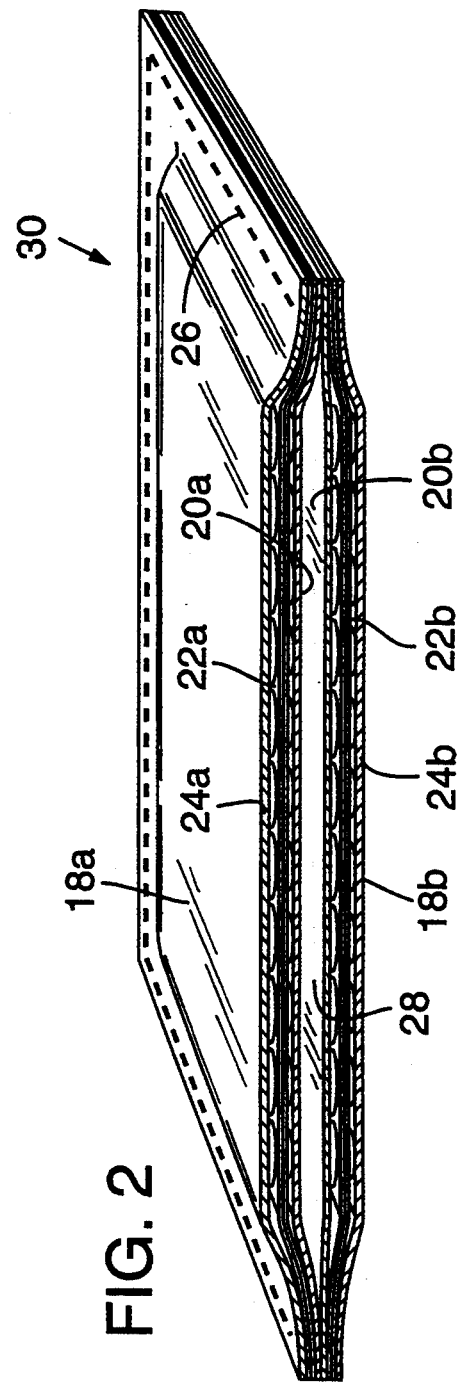
FIG. 2 is a perspective view, in partial section, showing part of a container constructed with the composite that is illustrated in FIG. 1.

FIG. 2 is an illustration of a container 30 that may be formed from a multi-layer composite such as the composite 18 illustrated in FIG. 1. More particularly, FIG. 2 illustrates a portion of a container 30 that may be advantageously employed to cover metal articles, such as guns.

The container 30 comprises top and bottom composite layers 18a and 18b, respectively. The top composite layer 18a includes an oil-impregnated sheet 20a, an outer layer 24a, and a liquid-impervious cushioning layer 22a positioned between the sheet 20a and outer layer 24a. Similarly, the bottom composite 18b includes an oil-impregnated sheet 20b, an outer layer 24b, and a liquid-impervious cushioning layer 22b positioned between the sheet 20b and outer layer 24b.

As noted earlier, the sheets 20a, 20b are constructed in a manner substantially identical to the sheet 20 described with respect to the embodiment depicted in FIG. 1. The cushioning layers 22a, 22b and outer layers 24a, 24b are selected to have physical characteristics matching the corresponding cushioning layer 22 and outer layer 24 of the multi-layer composite 18 described with respect to FIG. 1.

The top composite 18a and bottom composite 18b are arranged so that the oil-impregnated sheets 20a, 20b are adjacent one another. The composites 18a and 18b are fastened, such as by stitching 26, at the edges to define a compartment 28 into which an article may be placed. As shown in FIG. 2, the walls of the compartment 28 are made up of the oil-impregnated sheets 20a, 20b.

It can be appreciated that a multitude of alternative configurations and assembly techniques may be used in constructing a container 30 as described above. For example, the layers of the container 30 in FIG. 2 may be hermetically sealed and the compartment 28 evacuated so that any article within the compartment will be contained within an environment free from the corrosive effects of air or water. Moreover, the sheets 20a and 20b may be impregnated with an oil having a substantially high vapor pressure so that the compartment 28 will become saturated with the oil vapor. The oil vapor within the compartment 28 will penetrate any minute voids or other small, difficult-to-reach locations on or in the enclosed article. The vapor will condense on exposed portions of the article, thereby providing the article with a very thin protective coating of oil.

The vapor penetration just mentioned may be best accomplished with an oil that will vaporize at room temperature. As a vapor, the oil can travel through the air and recondense on the surface of a metallic article in close proximity to the wrapping material. Through this vaporization and condensation process, the oil coats the surface of the metallic article within the wrapping material. The oil coating provides an effective barrier to inhibit moisture from oxidizing the surface of the metal.

A variety of oils may be used as a vapor corrosive inhibitor. The oil must have a boiling point and a vapor pressure sufficient to promote its vaporization at room temperature. Oils with a boiling point within the range of about 200° F. to about 800° F. at atmospheric pressure and a vapor pressure within the range of about $7 \times 10^{-4}$ mm Hg to about $9 \times 10^{-4}$ mm Hg at 100° F. will vaporize at temperatures of about 40° F. or above. It will be appreciated that a greater amount of oil will vaporize as the surrounding temperature increases. Virtually any oil, including petroleum oils, plant-based oils and synthetic oils may be used in the sheet of the present invention. Mineral oil is preferred for safety reasons as it may be less flammable than petroleum oils. However, any petroleum oil may be used.

A surfactant may be added to the oil-impregnated sheet. The surfactant acts as a wetting agent to reduce the surface or interfacial tension between the oil flowing from the sheet and the metal article so that the oil may more effectively cover the surface of the metal more quickly. The surfactant "wets out" the surface so that the oil may more completely coat the metal article. The surfactant allows the oil to coat or cover a greater area of the metallic surface, thereby reducing the amount of surface metal that is exposed to moisture.

Amphiphatic molecules are particularly effective surfactants. An amphiphatic molecule has a polar or hydrophilic head and a non-polar or hydrophobic tail. The polar head of the amphiphatic surfactant is attracted to the surface of the metal while the non-polar tail extends away from the metal. The non-polar or hydrophobic tail repels moisture and prevents or inhibits it from reaching the metallic surface. An amphiphatic surfactant may include aliphatic, cyclic or aromatic groups in any combination.

In addition, certain vaporizable surfactants may be used to provide enhanced protection from corrosion. As a vapor, the surfactant may more effectively cover the metallic article. These surfactants have a boiling point and a vapor pressure sufficient to promote vaporization at about room temperature. Petroleum-based surfactants, having a boiling point within the range of about 200° F. to about 800° F. at atmospheric pressure and a vapor pressure within the range of about $5 \times 10^{-4}$ mm Hg to about $10 \times 10^{-4}$ mm Hg are preferred. Of the petroleum-based surfactants, sodium petroleum sulfonate is preferred due to its molecular weight. Surfactants having a molecular weight of about 300 to about 500 are likely to vaporize at room temperature.

Another advantage of the oil-impregnated sheet of the present invention pertains to the desiccative attributes of the preferred silica filler component of that sheet. More particularly, whenever the sheet is exposed to water vapor, such as may be present in the sealed compartment 28 of the container described above, the affinity of the silica filler to bond with water molecules will reduce the amount of water vapor within the compartment, thereby reducing the corrosive effects of the water vapor. In some particularly moist environments, it may be desirable to reduce the content of the impregnated oil to a level below that specified above, thereby exposing more of the silica filler to make available more bonding sites for water molecules. As the oil in the sheet is reduced through use, the amount of silica exposed to the moisture will increase, thus increasing the desiccative effect of the filler.

While the present invention has been described in accordance with preferred embodiments, it is to be understood that certain substitutions and alterations may be made thereto without departing from the spirit and scope of the appended claims. For example, the polyolefin-based component may comprise solely a polyolefin, hence not being blended with the polyolefin copolymer as described above.

We claim:

1. A method of forming a container for protecting a stored article from deterioration, comprising the steps of:

forming a blended mixture comprising an ultrahigh molecular weight polyolefin, polysilicate particles and an oil that inhibits deterioration of the article, in sufficient amounts that the oil comprises about 20% to 70% by weight of the mixture;

extruding the mixture into a porous sheet containing the oil and polysilicate particles; and forming a container for the article, wherein an interior surface of the container, that faces an interior of the container, is the extruded sheet containing the oil from the mixture, such that the oil transfers gradually from the sheet to the article in the container over time.

2. The method of claim 1, further comprising the step of placing the article in the container.

3. The method of claim 1, further comprising the step of providing a liquid impervious outer wall for the container that diminishes oil loss from the container.

4. The method of claim 3, wherein the step of providing the liquid impervious outer wall comprises securing a cushioning layer to the extruded sheet, wherein the cushioning layer includes air filled embossments.

5. The method of claim 1 wherein the oil has a boiling point in the range of about 200° F. to about 800° F. at atmospheric pressure, a vapor pressure within the range of about $7 \times 10^{-4}$ mm Hg to $9 \times 10^{-4}$ mm Hg at 100° F., and vaporizes at a temperature of 40° F. or above.

6. The method of claim 5 wherein the oil is a petroleum oil or plant oil.

7. The method of claim 6 wherein the article is a metal article and the oil is mineral oil.

8. The method of claim 1 further comprising the step of providing a surfactant in the sheet in a sufficient amount to reduce interfacial tension between the oil in the sheet and a surface of the article so that the oil covers the surface of the article more completely than it would in the absence of the surfactant.

9. The method of claim 1 wherein the mixture further comprises a polyolefin that is formed of an olefin and an ethylenically unsaturated monocarboxylic acid selected from the group consisting of acrylic acid, methacrylic acid, and mixtures thereof.

10. The method of claim 5 wherein the oil is capable of vaporizing, and the method further comprises the step of selectively sealing the container after placing the article in the container so that the oil vaporizes and permeates the interior of the container with the oil.

11. A method of forming a container for protecting a stored article from deterioration, comprising the steps of:

forming a blended mixture comprising an ultrahigh molecular weight polyolefin, polysilicates, a surfactant and an oil that inhibits deterioration of the stored article, wherein the polyolefin comprises an ultrahigh molecular weight polyolefin blended with a polyolefin copolymer that is formed of an olefin and an ethylenically unsaturated monocarboxylic acid selected from the group consisting of acrylic acid, methacrylic acid, and mixtures thereof, the polysilicates are aggregates of particles having a diameter between about 1.0 and 20.0 microns that comprise between 50% to 75% by weight of the blended mixture of ultrahigh molecular weight polyolefin and polysilicates, and the anticorrosive oil has a boiling point in the range of about 200° F. to about 800° F. at atmospheric pressure, a vapor pressure within the range of about $7 \times 10^{-4}$ mm Hg to $9 \times 10^{-4}$ mm Hg at 100° F., and vaporizes at a temperature of 40° F. or above, wherein the oil comprises about 20% to 70% by weight of the mixture and is selected from the group consisting of a petroleum oil and a plant oil;

extruding the mixture into a porous sheet having a front face and a rear face, the porous sheet containing the oil from the mixture and polysilicate particles, wherein the porous sheet retains the oil from the mixture by capillary action;

providing a container that includes a compartment for the article, wherein an interior surface of the compartment is the front face of the porous sheet containing the oil that was provided in the mixture, and the rear face of the sheet is secured to a liquid impervious outer layer that diminishes oil loss from the rear face of the porous sheet; and placing the article in the container for a sufficient period of time that the oil and surfactant transfer gradually from the front face of the sheet to the article in the compartment over time.

12. The process of claim 11, wherein the step of providing the container comprises fastening a pair of the sheets together along edges of the sheet to form the compartment, and the liquid impervious outer layer is a cushioning layer.

13. The process of claim 11 wherein the step of placing the article in the container comprises placing a gun in the compartment of the container.

14. The process of claim 11 wherein the oil is selected from the group consisting of linseed oil, lemon oil and mineral oil.

15. The process of claim 12 wherein the article is a leather article, and the oil is linseed oil.

16. The process of claim 12, wherein the article is a wooden article, and the oil is lemon oil.

17. The process of claim 12, wherein the article is a metal article, and the oil is mineral oil.

18. A method of forming a container for protecting a stored metal article from corrosion, comprising the steps of:

forming a blended mixture comprising an ultrahigh molecular weight polyolefin, aggregates of polysilicate particles, a surfactant, mineral oil, and an antioxidant, wherein the polyolefin comprises an ultrahigh molecular weight polyolefin blended with a polyolefin copolymer that is formed of an olefin and an ethylenically unsaturated monocarboxylic acid selected from the group consisting of acrylic acid, methacrylic acid, and mixtures thereof, the aggregates of polysilicate particles have a diameter between about 1.0 and 20.0 microns and comprise between 50% to 75% by weight of the blended mixture of ultrahigh molecular weight polyolefin and polysilicates, and the anticorrosive mineral oil has a boiling point in the range of about 200° F. to about 800° F. at atmospheric pressure, a vapor pressure within the range of about $7 \times 10^{\times 4}$ mm Hg to $9 \times 10^{-4}$ mm Hg at 100° F., and vaporizes at a temperature of 40° F. or above, wherein the mineral oil comprises about 20% to 70% by weight of the mixture;

extruding the mixture into a porous sheet having a front face and a rear face, the porous sheet containing the oil and polysilicate particles, wherein the porous sheet retains by capillary action the oil that was provided in the mixture;

providing a container that includes a compartment for the article by securing two of the extruded sheets to each other with opposing front faces containing the oil that was provided in the mixture, and the rear face of each sheet is secured to a liquid impervious cushioning layer with air filled embossments that diminishes oil loss from the extruded sheet; and placing the metal article in the container and closing the container such that the mineral oil, antioxidant and surfactant transfer from the sheet to the metal article in the compartment over time.

19. The method of claim 18 wherein the oil comprises 70% by weight of the mixture.

20. The method of claim 18 wherein the antioxidant is present in an amount of 0.1% by weight of the mixture.

21. The method of claim 18 wherein the surfactant has a molecular weight of 300–500.

* * * * *

UNITED STATES PATENT AND TRADEMARK OFFICE
CERTIFICATE OF CORRECTION

PATENT NO. : 5,426,916
DATED : June 27, 1995
INVENTOR(S) : Thomas E. Grigsby, William B. Brecht, John W. Swanson It is certified that error appears in the above-indentified patent and that said Letters Patent is hereby corrected as shown below:

Title page, Item [75] Inventors should read as follows:

Thomas E. Grigsby, of Corvallis, Oreg.;
William B. Brecht, of Seal Beach, Calif.;
John W. Swanson, of Portland, Oreg.

In the Specification:

Col. 3, line 48:    nature should be: natural

Col. 3, line 48:    portland should be: Portland

In the Claims:

Col. 10, line 16:   $7 \times 10^{x4}$ should be: $7 \times 10^{-4}$

Signed and Sealed this

Fourteenth Day of May, 1996

*Attest:*

BRUCE LEHMAN

*Attesting Officer*     *Commissioner of Patents and Trademarks*